United States Patent [19]

Po et al.

[11] Patent Number: 4,759,596
[45] Date of Patent: Jul. 26, 1988

[54] WAVELENGTH SELECTIVE OPTICAL CAVITY INCLUDING HOLOGRAPHIC FILTER LAYERS

[75] Inventors: Hong Po, Millis; William T. Plummer, Concord, both of Mass.

[73] Assignee: Polaroid Corporation, Cambridge, Mass.

[21] Appl. No.: 645,694

[22] Filed: Aug. 30, 1984

[51] Int. Cl.$^4$ ............................ G02B 6/26; H04B 9/00; G02F 1/00
[52] U.S. Cl. ........................... 350/96.15; 350/96.16; 350/96.19; 350/3.6; 350/3.7; 350/311; 370/1; 370/3; 455/600; 455/602
[58] Field of Search ............... 350/96.10, 96.15, 96.16, 350/96.19, 96.20, 96.21, 96.29, 96.30, 3.6, 3.61, 3.65, 3.66, 3.67, 3.7, 3.72, 3.83, 3.84, 3.81, 311; 372/6, 97; 331/154, 155; 455/600, 602; 370/1, 2, 3, 4

[56] References Cited

U.S. PATENT DOCUMENTS

| | | | |
|---|---|---|---|
| 3,308,394 | 3/1967 | Snitzer et al. | 331/94.5 |
| 3,871,742 | 3/1975 | Kaminow et al. | 350/96.29 |
| 3,891,302 | 6/1975 | Dabby et al. | 350/96.12 |
| 3,944,322 | 3/1976 | Benton | 350/3.84 X |
| 3,958,188 | 5/1976 | Fletcher et al. | 331/94.5 C |
| 3,993,485 | 11/1976 | Chandross et al. | 96/27 H |
| 4,146,298 | 3/1979 | Szczepanek | 350/3.72 |
| 4,342,499 | 8/1982 | Hicks | 350/96.15 |
| 4,358,851 | 11/1982 | Scifres et al. | 372/97 |
| 4,400,056 | 8/1983 | Cielo | 350/96.19 |
| 4,592,043 | 5/1986 | Williams | 370/3 |

OTHER PUBLICATIONS

Leite et al., "Holographic Coupler for Fibre Optics Communication", SPIE vol. 213, Pro. Soc. Photo-Opt. Eng. 1979, pp. 9–17.
Soares, "Holographic Coupler for Fiber Optics", Optical Engineering, Sep./Oct. 1981, vol. 20, No. 5, pp. 740–745.
Sincerbox, "Formation of Optical Elements by Holography", IBM Tech. Discl. Bull. vol. 10, No. 3, Aug. 1967, pp. 267–268.

Primary Examiner—William L. Sikes
Assistant Examiner—Brian M. Healy
Attorney, Agent, or Firm—Francis J. Caufield

[57] ABSTRACT

An optical resonant cavity adapted to receive, as an input from a transmission trunk line, a group of optical signals distributed in wavelength over a predetermined band and to provide, as an output, a narrower band of the optical signals. The wavelength selective nature of the cavity stems from a modification of its resonant modes with periodic structures that are interferometrically formed as alternating layers of high and low index of refraction in photopolymeric material at its opposite ends and operate to suppress resonant modes at wavelengths outside of the narrow band desired as an output.

8 Claims, 3 Drawing Sheets

WAVELENGTH SELECTIVE OPTICAL CAVITY INCLUDING HOLOGRAPHIC FILTER LAYERS

BACKGROUND OF THE INVENTION

This invention in general relates to optical communications and in particular to wavelength selective devices for transferring optical signals, or portions of optical signals, from one optical fiber line to another.

The use of optical fiber as a medium for transmitting information as modulated electromagnetic waves in the optical region of the spectrum is a well-established practice known throughout the communications industry. The motivation for using optical fiber stems in part from its enormous information carrying capacity which, for a variety of reasons, has not yet been fully exploited. Major reasons for this are the lack of ability to modulate signal sources at rates comparable to the optical fiber carrying capacities and the inability of detectors to respond at rates comparable to the maximums allowable by the fiber. Even so, optical fiber based communication systems are still favored, particularly for future applications, and those skilled in the art have recognized that meanwhile fiber capacity can be exploited in ways other than through increases in source and detection modulation rates. For example, the total information per fiber goes up in proportion to the number of channels carried. Advantageously, the number of switching ports also increases as the number of channels increases, and the cost per channel decreases. Thus, through the simple expediency of increasing the number of channels carried per fiber, one can increase the total information transferred even at current source modulation and detection rates.

However, for optimal results, this approach is best with narrow spacing between wavelengths assigned channels and requires wavelength selective coupling devices capable of separating off channels where required in a network as at switching ports, branches, repeaters, demultiplexing stations, or subscriber ports.

Wavelength selective couplers are known in the art. One coupler uses a dichroic reflector in line to achieve full duplex operation. More than two channels can be multiplexed using this technique with more than one dichroic if different in characteristic.

Other couplers employ prism dispersion or diffraction gratings to spatially separate different channels and then focus the spatially separated channels with appropriate bulk optics into preselected fibers for further use.

Wavelength selective lateral coupling between optical fiber devices, as opposed to in-line coupling, is also possible. U.S. Pat. No. 4,342,499 issued Aug. 3, 1982, in the name of John W. Hicks, Jr., for example, describes dispersive lateral coupling between two fiber cores. However, the construction of couplers by such means requires precise control of fiber diameter and relatively long coupling lengths between cores for very narrow bandwidth transfer.

Another means for wavelength selective lateral coupling is described in U.S. patent application Ser. No. 331,052 filed in the name of John W. Hicks, Jr. on Dec. 16, 1981, now abandoned, and entitled "OPTICAL RESONANT CAVITY FILTERS". Here, either polished and highly reflective metallic mirrored ends or ends with highly reflective multilayer interference coatings are required to define an optical resonant cavity which is, in turn, laterally coupled into a trunk line. At the scale required, it appears relatively difficult to fabricate such reflective ends.

Consequently, it is a primary object of the present invention to provide a wavelength selective coupler for transferring closely spaced signals between optical fibers.

Another object of the present invention is to provide a coupler which is wavelength selective and yet relatively easy to fabricate.

Other objects of the invention will, in part, be obvious and will, in part, appear hereinafter. The invention, accordingly, comprises the apparatus possessing the construction, combination of elements, and arrangement of parts exemplified in the detailed disclosure which follows.

SUMMARY OF THE INVENTION

This invention generally relates to optical communications and more particularly to wavelength selective devices and systems by which a narrow band of optical signals, or portions of optical signals, from a broader band on one optical fiber line can be transferred to another.

The device of the invention is a coupler that is particularly suitable for use in a fiber based communications system in which a number of information-bearing optical signals travelling together on a single fiber, but on separate and distinct wavelength channels, are required to be transferred to other fiber(s) in accordance with an adopted transfer system based on the channel or carrier wavelength.

The coupler of the invention is a wavelength selective device which is capable of transferring either only one or a group of adjacent channels from a trunk waveguide to at least one other waveguide.

The coupler comprises a resonant cavity waveguide structure which has a portion adapted to be laterally coupled to the trunk in a dispersive or nondispersive manner to transfer a small percentage of a predetermined band of the optical signals travelling on the trunk into the coupler. The configuration of the resonant cavity waveguide structure is such that it resonates at either only one wavelength corresponding to one of the channels assigned to carry the optical signals or at a group of wavelengths spaced in correspondence with the spacing between a group of adjacent optical signal channels while in either case suppressing all others outside of a narrow band of channels desired to be transferred.

Another portion of the resonant cavity waveguide structure is adapted to be laterally coupled in a dispersive or nondispersive manner with another waveguide or waveguides to transfer the desired optical signals from the resonant cavity waveguide structure to the other waveguide.

Preferably, the resonant cavity waveguide structure comprises a single mode optical fiber that is of a given length and includes a core of predetermined index of refraction surrounded by a cladding of lower index. Alternating layers of high and low index of refraction are interferometrically formed in photopolymeric material at opposite ends of the fiber and in part provide the cavity with its resonant properties by suppressing cavity resonant modes outside of the narrow band desired as an output.

DESCRIPTION OF THE DRAWINGS

The novel features that are considered characteristic of the invention are set forth with particularity in the appended claims. The invention itself, however, both as to its organization and method of operation, together with other objects and advantages thereof will be best understood from the following description of the illustrated embodiments when read in connection with the accompanying drawings wherein like numbers have been employed in the different figures to denote the same parts and wherein:

DETAILED DESCRIPTION

Figure 1:
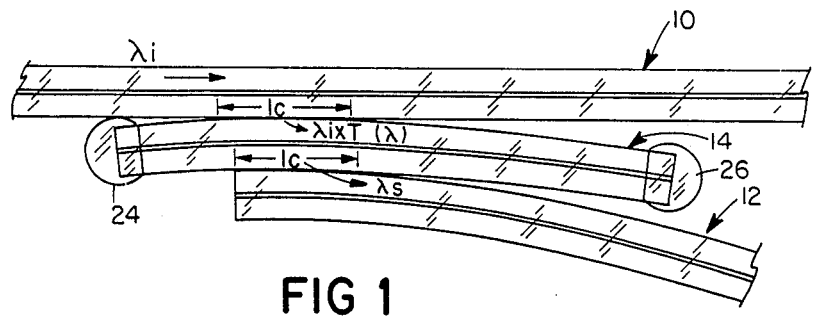
FIG. 1 is a diagrammatic side elevation of part of a fiber based communications system including the coupler of the invention.

This invention relates to a wavelength selective coupler that is particularly suitable for use in an optical fiber based communications system in which a number of information-bearing optical signals travelling together along a single fiber, but on separate and distinct channels spaced in wavelength, are required to be selectively transferred to another fiber or fibers in accordance with an adopted transfer system based on channel or carrier wavelength. Part of such a system is shown diagrammatically in FIG. 1 along with the coupler of the invention. Here, an optical fiber transmission line, trunk or waveguide 10 is adapted in a well-known manner to carry a large number of wavelength division multiplexed information-bearing optical signals each of which is a modulated electromagnetic carrier wave in the optical region of the spectrum, preferably between 0.6 and 1.55 micrometers. The total number of signals ($\lambda_1, \lambda_2, \ldots \lambda_n$) propagating along the trunk 10 can be as many as ten thousand (10,000) spaced apart by one (1) Angstrom as seen in FIG. 2, or more with higher density packing which would require closer spacing. However, one Angstrom spacing can be assumed for present purposes with a source spread of perhaps 0.5 Angstroms as shown. With a nominal wavelength for the zeroth channel of, say, 1.0 micrometer or 10,000 Angstroms, the other channels would then be in 1 Angstrom steps on either side of 10,000 Angstroms as convenient until all spaces were filled to the required number of channels.

Figure 2:
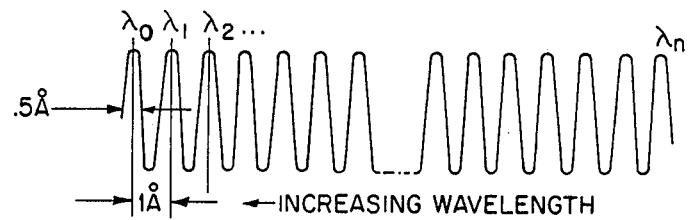
FIG. 2 is a graph illustrating representative spacing and bandwidth of a plurality of optical signal channels carried on a trunk line of the system of FIG. 1.

Now, assume it is required to transfer a predetermined channel, say the one operating at a carrier wavelength of 10,020 Angstroms, to another fiber such as that designated at 12 in FIG. 1 for further transmission to a system subscriber without depleting the power in the remaining channels on the trunk 10 to a point which would render them undetectable by subsequent downstream users. Or, alternatively, it may be required to transfer a block of adjacent channels, say 10,020 Angstroms to 10,050 Angstroms, to the fiber 12 which now might be a branch line. Either one of these tasks may be accomplished by the coupler of the invention which is shown diagrammatically at 14 in FIG. 1.

The coupler 14 is an optical resonant cavity waveguide, preferably a specially configured optical fiber, that is laterally coupled in a manner to be described to both the trunk 10 and the transfer fiber 12. In operation, a small percentage of the signal strength of a group of channels, which includes the channel or channels to be transferred to the fiber 12, is first transferred from the trunk 10 to the coupler 14. The coupler 14 then resonates at only the channel wavelength or wavelengths desired and it is this channel or channels which are then coupled into the transfer or branch fiber 12.

The lateral couplings between the coupler 14 and both the trunk 10 and transfer fiber 12 are formed in a well-known manner which is understood to depend on the waveguide refractive indices, wavelength, waveguide geometry, core proximity between waveguides, and coupling length (indicated by $l_c$ in both cases) over which energy from one waveguide transfers to another. Other parameters being favorable, it is well-establshed that one hundred percent transfer occurs when the coupling length, $l_c$, of a pair of waveguides is some odd multiple of one-half of the so-called beat length. At odd multiples of one-quarter of the beat length, the energy is distributed equally between a pair. At other coupling lengths, more or less transfer can be achieved. Thus, proper choice of coupling length, $l_c$, along with other parameters such as core separation, provides means for achieving any degree of lateral coupling and this may also be made wavelength selective by control of the dispersion characteristics of the waveguides coupled as described, for example, in U.S. Pat. No. 4,342,499 issued to John W. Hicks, Jr. and incorporated herein by reference for this teaching.

Thus, the trunk signals tansferred to the coupler 14 can be limited in both bandwidth and amplitude and, for maximum conservation of signal, ought to be limited in both. However, it is also possible to transfer a small percentage of all the trunk signals (<10%) with benefit. One can imagine for such an application tapping off blocks of adjacent channels, perhaps 1,000 at a time, onto branch lines. Consequently, the first lateral coupling between the trunk 10 and the coupler 14, where the signals transferred are generally as indicated in FIG. 1 as $\lambda_i x T(\lambda)$, can be either dispersive or nondispersive, which in either case should be minimized in amplitude. If dispersive, it will be recognized that the bandwidth of the transfer functions will inherently be larger than the assumed channel spacing of 1 Angstrom and therefore not suitable for the task at hand, although usable for other applications not requiring the narrow bandwidth capability of the present invention.

Figure 3:
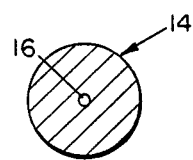
FIGS. 3, 4 and 5 are possible cross-sectional configurations for the optical fibers used in FIG. 1.
Figure 4:
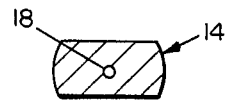
Figure 5:
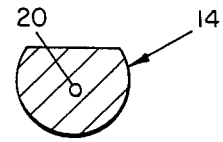

FIGS. 3, 4 and 5 show possible cross-sectional configurations which may be used for the coupler 14 to achieve the necessary coupling between it and the trunk 10 or transfer fiber 12. In each instance, the cross-hatching represents cladding of low index surrounding a core shown at 16, 18 and 20, respectively. The section of FIG. 4, which has flats on opposed peripheral sides is preferable, although the others may be used as long as the cores are made close enough for interaction of evanescent fields. This, of course, must be also so for the trunk 10 and transfer fiber 12.

Based on the above considerations, the coupling lengths, $l_c$, will be on the order of millimeters to a centimeter or so at most. For example, stepped index fiber with a numeral aperture (NA) of 0.12, a V-number of 2.0, and an intercore spacing to radius ratio of 4.0 requires approximately 3.0 millimeters for 100% coupling.

Figure 6:
FIG. 6 is a diagrammatic side elevation of the coupler of the invention.
Figure 7:
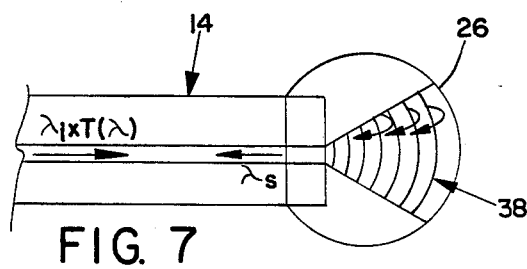
FIG. 7 is an enlarged diagrammatic side elevation of part of the coupler of FIG. 6.

The coupler 14, as best seen in FIG. 6, is a given length of single mode optical fiber whose core, which is preferably circular, is generally designated at 22. Single mode propagation, as is well known in the art, occurs when the relation below is satisfied:

$$2\pi(a/\lambda)(n_1^2-n_2^2)^{\frac{1}{2}} < 2.405$$

where $a$ = core radius, $\lambda$ is the wavelength, $n_1$ and $n_2$ are the core and cladding indices of refraction, and 2.405 is a constant whose value is the $0^{th}$ order Bessel function at the first root.

Thus, it is a second requirement that the coupler fiber core 22 and cladding be structured for single mode propagation of any channel wavelengths to be transferred to the transfer fiber 12. This requirement easily can be satisfied by selecting parameters in accordance with the above equation or approximately so where the core geometry is noncircular.

Once having assured that the core 22 will propagate the wavelength or wavelengths of interest, it is provided with an effective length, $L_r$, at opposite ends of which are periodic structures, 24 and 26, comprising alternating layers of high and low index of refraction that are interferometrically formed in a manner to be described to cause the fiber core 22 to act as a resonant cavity capable of supporting resonant standing wave modes at wavelengths one or more of which correspond only to preselected wavelength channels, i.e., the $\lambda_s$ indicated in FIG. 1.

The wavelength selectivity of the invention depends on the collective optical action attributable both to its length, $L_r$, and periodic structures, 24 and 26. For analytical purposes, the collective optical action can be broken down into that of a resonant fiber core of length, $L_r$, assuming a constant reflection over a broad band and the action of its periodic structures, 24 and 26, which is wavelength dependent operates to permit the cavity length, $L_r$, to support only resonant modes of vibration at wavelengths within a narrow band while suppressing those which would otherwise be present outside of that band. Thus, the final spectral transfer function of the resonant cavity structure 14 can be thought of as the product of individual transfer functions which when combined produce the wavelength selectivity sought.

As in other resonant cavity structures, the effective length, $L_r$, determines the frequency or wavelength of the resonances and is an integral number N of half wavelengths, i.e., $$L_r = N/2(\lambda/n_e)$$

where $\lambda$ is the free space wavelength and $n_e$ is the effective index of the cavity at the resonant mode.

The wavelength separation between resonant modes of the cavity is determined by changing the value of N and then subtracting successive possible resonant wavelengths assuming nearly equal values to arrive at the following equation for expressing the separation between modes.

$$\Delta\lambda = \lambda^2/2L_r n_e$$

An inspection of this equation reveals that the shorter the resonant cavity, the greater the spacing between resonant modes or between channels transferable.

In practice, the length of the fiber cavity 22 is chosen to be of some sensible scale which can be manipulated easily and so that its resonant modes contain the single channel, or adjacent group of channels, desired to be transferred, keeping in mind that the transfer function of the periodic structures, 24 and 26, modify this response in a manner to be described by suppressing some of these modes as unwanted resonant modes.

Thus, in the example with channels spaced apart by 1 Angstrom, a calculation using the last equation above starting with a nominal wavelength of 10,000 Angstroms and an index, $n_e$, of 1.5, puts the cavity length at approximately 3.3 millimeters. This is obviously quite small, but conveniently can be made 10 times larger and still meet the criteria above, except that at 3.3 centimeters it will have a line spacing of 0.1 Angstrom. This, however, would be perfectly acceptable since there is still a resonant mode every 1 Angstrom along with the others in between. The advantage to this approach is that there is channel space available for future use with closer packing, and the cavity length is made more managable than that dictated by strict adherence to the equations.

It is the total reflection of the periodic structures, 24 and 26, which provide the feedback necessary for the cavity 22 to support the standing wave resonant modes described above, and this reflectance, say R, must be high for low round trip loss and thus high finesse or Q where:

$$Q = \frac{2\pi L_r n_e}{(1-R)\lambda}$$

and wherein the line spread of each order is given by:

$$\Delta\lambda_s = \frac{(1-R)\lambda^2}{2\pi L_r n_e}$$

This last equation shows that the greater the value of R, the narrower the line width $\Delta\lambda_s$.

Because the periodic structures, 24 and 26, comprise alternating layers of high and low index of refraction, the reflection, R, is wavelength dependent as mentioned earlier and therefore limits the resonant modes which would otherwise be present in the fiber cavity 22.

The reflection, R, depends on the index ratio, $n_h/n_l$, of its layers where h=high and l=low and on the number of layers. The bandwidth of the reflection, R, increases with increasing values of $n_h/n_l$ and its amplitude increases as the number of layers increases.

The structures, 24 and 26, because of alternating layers of high and low index, are in effect holographic reflectors or reflection-type holograms, which are formed in a manner to be described, and have the property of being able to reconstruct one of the wavefronts used in their construction when illuminated by the other.

Figure 8:
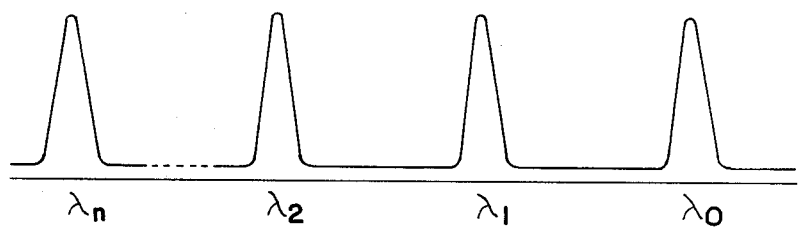
FIG. 8 is a diagrammatic illustration of the spacing between unmodified resonant orders or modes of the coupler of FIG. 6.
Figure 9:
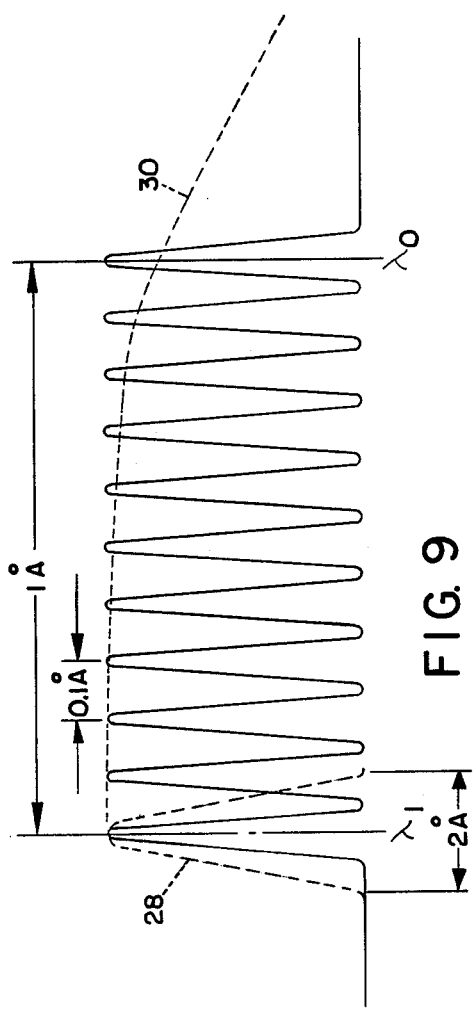
FIG. 9 is similar to FIG. 8 and further includes a transfer function associated with part of the coupler of the invention.

How the structures, 24 and 26, operate in combination with the fiber cavity 22 to selectively transfer only a desired channel or channels is illustrated in FIGS. 8 and 9.

FIG. 8 shows the unmodified resonant modes for the fiber cavity 22 starting with a wavelength $\lambda_o$, followed by progressively shorter wavelengths $\lambda_1, \lambda_2 \ldots \lambda_n$.

For the first case, assume only the channel operating at $\lambda_1$ is desired to be transferred. Here, the transfer function required for the periodic structures, 24 and 26, is indicated in FIG. 9 at 28. The bandwidth of this function (28) is slightly larger than 0.5 Angstrom as shown and therefore cuts off all other resonant modes. On the other hand, a transfer function like that indicated at 30 in FIG. 9 will transfer not only $\lambda_1$, but also adjacent channels $\lambda_o$ and $\lambda_2$ (not shown).

Consequently, the properties of the resonant fiber cavity 22 and the periodic structure, 24 and 26, are usefully combined in a novel way to provide a wavelength selective coupler which can be used for a variety of applications in a fiber based communications sytem.

The lateral coupling between the coupler 14 and the transfer fiber 12 can be either dispersive or nondispersive, but in either case preferably should be arranged for maximum transfer to preserve signal strength for subsequent use along the transfer fiber 12.

Figure 10:
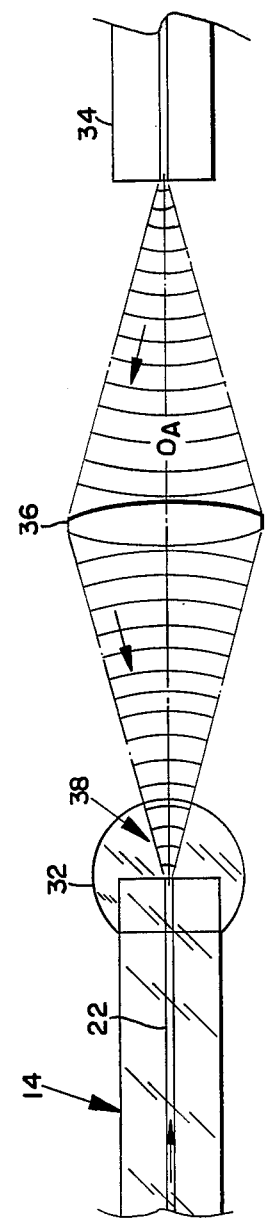
FIG. 10 is a diagrammatic side elevation illustrating apparatus used in fabricating part of the inventive coupler.

The alternating layers of high and low index in the structures, 24 and 26, are interferometrically formed, preferably in blobs of suitable photopolymer or phase holographic material as shown diagrammatically in FIG. 10 where a typical blob is indicated at 32.

Each blob 32 is formed by dipping the fiber end into the photopolymer and centrifuging the fiber until the blob 32 is sufficiently thick to achieve high diffraction efficiency and proper bandwidth.

After the blobs (32) are formed on the fiber ends, the fiber is then supported and its core 22 aligned coaxially along an optical axis, OA, with another fiber, say 34, having identical properties. A lens 36 is placed between the fibers to image the output from one into the other in a well-known manner.

A common coherent source is simultaneously sent down both fibers, while taking care to preserve optical path length travelled in both fibers. The photopolymer 32 is exposed for an appropriate period of time to the interference pattern (indicated at 38) formed by the interaction of the wavefronts from both fibers. This, in turn, creates a series of layers of alternating high and low index as required. With proper post exposure treatment, these index variations are made permanent and operate as a reflector for channels propagating along the fiber cavity 22 at the wavelength at which the photopolymer 32 was exposed. The exposed and cured photopolymer 32 thus is effectively a reflection hologram with respect to any resonant mode of the cavity with a wavelength corresponding to the exposure wavelength.

In addition to the required thickness of the polymeric blob, it otherwise must have sufficient sensitivity within the spectral range of interest and have high resolution to record the high density of optical fringes necessary for practical operation.

Also, exposure must be from opposite sides as with the arrangement illustrated to operate as a reflection hologram.

If desired, several thin or thick layers can be placed over the initial blob and exposed at wavelengths other than that of the intial exposure so that the coupler 14 operates over different wavelength bands.

Although the external shape of the polymeric blob is depicted as spherical, the exact shape is of no importance because the reflecting layers are formed inside. However, if the shape is different from that shown, suitable provision must be made for achieving good quality optical waves for exposure.

Those skilled in the art may practice the invention in other ways in accordance with its teachings and still be within its scope. Therefore, it is intended that all matter contained in the above description or shown in the accompanying drawings shall be interpreted as illustrative and not in a limiting sense.

What is claimed is:

1. An optical resonant cavity comprising an optical fiber of given length and holographic reflection means located at at least two spaced apart locations along said optical fiber, partially overlying the circumferential surface thereof, to define an optical resonant cavity therebetween, said holographic reflection means comprising a photopolymer exposed in place on said optical fiber with a standing radiant wave to form therein an interference pattern such that said holographic means and said optical fiber are configured and arranged with respect to one another for facilitating resonance between said locations of a given band of wavelengths while suppressing resonance of wavelengths outside of said band.

2. The cavity of claim 1 wherein said optical fiber is single mode and said holographic reflection means are located at opposite ends of said optical fiber.

3. The cavity of claim 2 wherein said optical fiber is further adapted to be laterally coupled to a transmission line to transfer within a predetermined band of wavelengths at least portions of optical signals travelling along the transmission line.

4. A wavelength selective coupler for transferring a predetermined number of optical signals from a transmission waveguide to at least one other waveguide where each optical signal is carried on a distinct wavelength, said coupler comprising a resonant cavity waveguide structure having a portion thereof adapted to be laterally coupled to the transmission waveguide for transferring a small predetermined percentage of a group of the optical signals travelling therealong where said group encompasses said number of optical signals, said waveguide structure comprising an optical fiber and holographic reflection means comprising a photopolymer exposed in place on said optical fiber with a standing radiant wave to form therein an interference pattern such that said structure resonates over a given band of wavelengths corresponding to the wavelengths of said number of optical signals while suppressing all other wavelengths outside of said given band.

5. The optical coupler of claim 4 wherein said optical fiber is single mode and of given length.

6. The optical coupler of claim 5 wherein said holographic reflection means are located at each end of said optical fiber.

7. An optical fiber communication system, said system comprising:
an optical fiber transmission line adapted to carry a plurality of information-bearing optical signals each on a distinct channel of predetermined wavelength; and
an optical resonant cavity comprising a given length of optical fiber and holographic reflection means located at spaced apart locations along said optical fiber to define an optical resonant cavity therebetween, said optical resonant cavity being laterally coupled to said transmission line so that at least a predetermined portion of the optical signals over a first band of wavelengths are transferred to said optical resonant cavity, said holographic reflection means comprising a photopolymer exposed in place on said optical fiber with a standing radiant wave to form therein an interference pattern such that said optical fiber and said holographic means are configured and arranged with respect to one another so that cavity resonates over a second band of wavelengths narrower than said first band while supressing resonance of wavelengths outside of said second band.

8. The system of claim 7 further including a transfer fiber laterally coupled to said resonant cavity to transfer said optical signals within said second band of wavelengths from said resonant cavity to said transfer fiber.

* * * * *